July 24, 1951  R. H. FRIED ET AL  2,561,920
FOOD CHOPPER
Filed Feb. 21, 1948
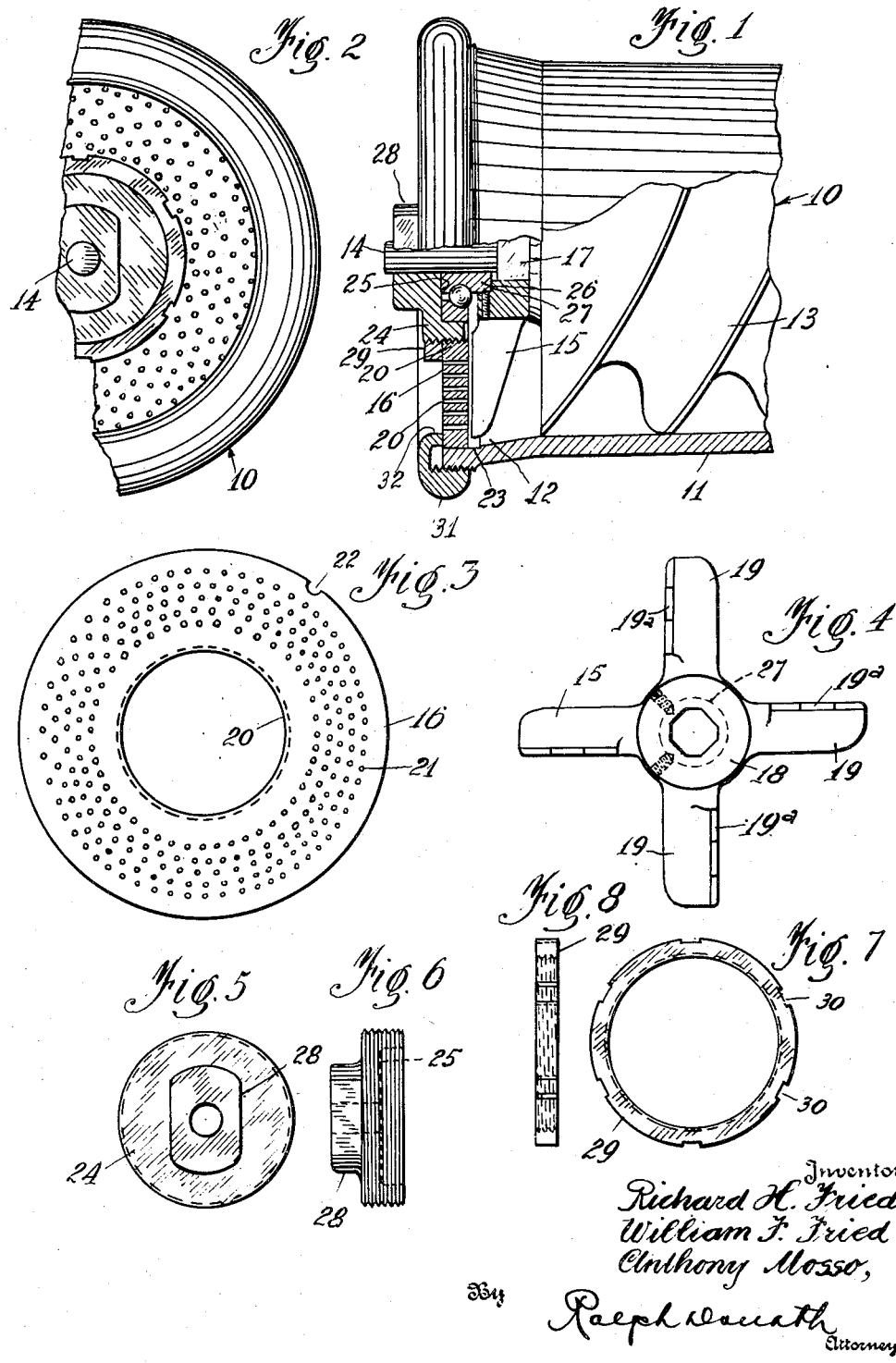
Inventors
Richard H. Fried,
William F. Fried,
Anthony Mosso,
By Ralph Donath
Attorney Patented July 24, 1951

2,561,920

UNITED STATES PATENT OFFICE 2,561,920

FOOD CHOPPER

Richard H. Fried and William F. Fried, Pittsburgh, and Anthony Mosso, Latrobe, Pa.

Application February 21, 1948, Serial No. 10,026

5 Claims. (Cl. 146—189)

This invention relates to a commercial food chopper of the screw type including a stationary perforated disc and a cutter mounted on and rotating with the screw. In particular, the invention relates to means mounting the disc for axial adjustment toward and from the cutter.

The conventional, commercial food chopper of the screw type has between the stationary perforated disc and the rotary cutter an endplay or a varying axial clearance which causes the considerably harder rotary cutter to wear a groove into the perforated disc.

If the initial clearance be materially reduced by wear of the screw journals, for example, the cutter may actually make contact with the disc in such manner as to scrape turnings therefrom, thus rendering the food dangerous to the consumer. For efficient operation and satisfactory results in using a food chopper of the screw type on different classes of material, furthermore, we have found that it is desirable to vary the clearance between the stationary perforated disc and the rotary cutter in accordance with the character of the material. Soft material such as fat meat, for example, requires a closer clearance than harder material such as steak or other compact meat.

The object of our invention is to provide a commercial type food chopper of the screw type with an adjustable mounting for the perforated disc permitting it to be moved fixedly toward or from the cutter affording variable clearance therebetween depending on the class of material being ground.

We have invented a novel mounting for the perforated disc of a commercial food chopper of the screw type whereby the spacing of the disc from the rotary cutter may be adjusted to insure satisfactory operation on different classes of material and to take up any wear that may occur, thus preventing the cutter from actual contact with the disc at all times and eliminating the danger of metal turnings or scrapings getting into the food.

In a preferred embodiment, we provide a chopper having a barrel and a screw rotatable therein, with an external perforated disc and an internal rotary cutter. The cutter is secured on a squared portion of the journal or trunnion of the screw. The disc has its periphery seated in the muzzle of the barrel and keyed thereto, and is axially adjustable toward and from the cutter. To this end, a stationary bearing bushing for the screw journal is disposed centrally in the disc and its axial position relative to the journal is fixed by engagement with the cutter. The disc is threaded on the bushing and may be adjusted axially thereof simply by rotation. A lock nut serves when turned down on the disc to hold it in adjusted position. A retainer ring threaded on the muzzle of the barrel has an inturned flange engaging the periphery of the disc.

A complete understanding of the invention may be obtained from the following detailed description thereof which refers to the accompanying drawings illustrating the present invention of the preferred embodiment.

In the drawings,

Figure 1 is a partial side elevation of a food chopper having the invention incorporated therein, partly broken away and partly in section on a vertical axial plane.

Figure 2 is an end elevation of Figure 1.

Figure 3 is a face view of the perforated disc.

Figure 4 is a face view of the rotary cutter.

Figure 5 is a face view of the bearing bushing.

Figure 6 is a side elevation of Figure 5.

Figure 7 is a face view of the lock nut, and

Figure 8 is an edge view thereof.

Referring in detail to the drawings, the chopper 10 to which the invention is applied comprises a barrel 11, the muzzle or outlet end of which is designated by the numeral 12. A screw 13 rotatable in the barrel 11 has a journal or trunnion 14 at the outer end thereof. The other end of the screw (not shown) may be provided for any desirable power drive. The barrel has the usual inlet opening on the upper side at the power end.

Food fed forward by the screw 13 through the barrel 11 is chopped by the relative rotation between a cutter 15 and a perforated disc 16. The cutter is mounted on a squared portion or seat 17 on the journal 14 adjacent the end of the screw for rotation therewith.

As shown in Figure 4, the cutter comprises a hub 18 provided with a plurality of radial blades 19 the leading edges 19a of which are ground to the desired sharpness. When the cutter is placed on its seat, its hub abuts the end of the screw. The disc 16 has a large central hole 20 therein and a plurality of small perforations or holes 21 through which the food is extruded by the screw. The disc also has the usual notch 22 for engaging a fixed key in the muzzle of the barrel. The muzzle is bored as at 23 to form a seat for the periphery of the disc.

A bearing bushing 24 is drilled to receive the journal 14 and is counterbored as at 25 to accommodate an antifriction bearing 26 therefor.

The hub 18 of the rotary cutter is counterbored as at 27 to receive the inner end of the inner race of the bearing. The bushing 24 is thus fixed axially relative to the screw 13 while the bearing 26 permits free rotation of the journal 14 in the bushing. This bushing is threaded externally and has an outwardly projecting boss 28 with parallel sides for engagement by the jaws of a wrench.

The hole 20 through the disc 16 is threaded interiorly and is of such size as to permit the disc to be screwed on the bushing 24. It will thus be apparent that, when the screw 13 is in position in the barrel and the bearing bushing is on the journal 14 with the inner race of the bearing 26 seated in the counterbore 27 in the cutter 18, rotation of the disc on the bushing will result in axial movement of the disc toward or from the cutter 15, thus varying the spacing or clearance between the cutting edges of the latter and the inner face of the former.

A lock nut 29 in the form of an internally threaded ring adapted to be screwed on the bushing 24 serves when turned tightly against the disc to hold it in adjusted position. The nut has slots 30 spaced circumferentially of its external periphery for engagement by a spanner nut wrench.

A retaining ring 31 is screwed onto the muzzle 23 and has an inturned flange 32 engaging the periphery of the disc 16 to resist the outward force resulting from the pressure applied to the food by the screw in order to extrude it through the holes or perforations 21.

The invention thus provides a food chopper having the important advantage of axial adjustability of the perforated disc relative to the rotary cutter. This makes it possible not only to maintain a predetermined minimum clearance despite wear but also to vary the clearance as desired to insure satisfactory processing of materials of different hardness.

The invention has the further advantage of simplicity since it involves but few additional parts compared to the conventional food chopper, and its cost is kept correspondingly low.

The adjustable mounting of our invention may be made up as a unit package with a perforated disc threaded thereon for sale as a replacement to users of existing food choppers, thus materially enlarging the market.

Although we have illustrated and described but a preferred embodiment of the invention, it will be recognized that changes in the details and arrangement may be made without departing from the spirit of the invention or the scope of the appended claims.

We claim:

1. In a food chopper including a barrel having a screw rotatable therein, a cutter on the screw adjacent the outlet end of the barrel, said cutter having a hub, and a journal on the screw extending outwardly through said hub, the improvement comprising a bearing bushing receiving said journal and seating against said hub, and a perforated disc adjustably threaded on said bushing and having its periphery seated in said end of the barrel for axial sliding motion, for cooperation with said cutter whereby to maintain the cutter and disc in adjusted spaced apart relationship.

2. In a food chopper including a barrel having a screw rotatable therein, a cutter on the screw adjacent the outlet end of the barrel, said cutter having a hub, and a journal on the screw extending outwardly through said hub, the improvement comprising a bearing bushing, an anti-friction bearing in said bushing receiving said journal and including inner and outer races, the inner race entering a counterbore in said hub, and a perforated disc adjustably threaded on said bushing and having its periphery seated in said end of the barrel for axial sliding motion, for cooperation with said cutter whereby to maintain the cutter and disc in adjusted spaced apart relationship.

3. In a food chopper including a barrel having a screw rotatable therein, a cutter on the screw adjacent the outlet end of the barrel, said cutter having a hub, and a journal on the screw extending outwardly through said hub, the improvement comprising a bearing bushing receiving said journal and seating against said hub, and a perforated disc adjustably positioned on said bushing and having its periphery seated in said end of the barrel for axial sliding motion and for cooperation with said cutter, whereby the cutter and disc are maintained in adjusted spaced apart relationship.

4. In a food chopper including a barrel having a screw rotatable therein, a cutter on the screw adjacent the outlet end of the barrel, said cutter having a hub, and a journal on the screw extending outwardly through said hub, the improvement comprising a bearing bushing, an anti-friction bearing in said bushing receiving said journal and including inner and outer races, the inner race entering a counterbore in said hub, and a perforated disc adjustably positioned on said bushing and having its periphery seated in said end of the barrel for axial sliding motion and for cooperation with said cutter, said inner race cooperating with the bearing bushing to maintain the cutter and the disc in adjusted spaced apart relationship.

5. In a food chopper including a barrel having a screw rotatable therein, a cutter on the screw adjacent the outlet end of the barrel, said cutter having a hub, and a journal on the screw extending outwardly through said hub, the improvement comprising a bushing recessed at one end for receiving bearing means, bearing means in said bushing adapted to receive the journal, adjustable means on the bushing for supporting a perforated disc and maintaining said disc in spaced apart relationship with the cutter, said perforated disc on the bushing having its periphery seated in the end of the barrel for axial sliding motion and for cooperating with said cutter.

RICHARD H. FRIED.
WILLIAM F. FRIED.
ANTHONY MOSSO.

REFERENCES CITED

The following references are of record in the file of this patent:

UNITED STATES PATENTS

| Number | Name | Date |
|---|---|---|
| 339,834 | Baker | Apr. 13, 1886 |
| 1,339,273 | Miller | May 4, 1920 |
| 1,694,502 | Dryden | Dec. 11, 1928 |
| 1,825,475 | Pfeiffer | Sept. 29, 1931 |
| 1,946,001 | Schaul | Feb. 6, 1934 |
| 1,987,172 | Ward | Jan. 8, 1935 |
| 2,199,030 | Ritter et al. | Apr. 30, 1940 |
| 2,259,623 | Dieckmann | Oct. 21, 1941 |